United States Patent
Taliercio et al.

(10) Patent No.: US 11,073,474 B2
(45) Date of Patent: Jul. 27, 2021

(54) DEVICE AND METHOD FOR DETECTING THE PRESENCE OF DETERMINED MOLECULES, AND BIOSENSOR

(71) Applicants: Universite De Montpellier, Montpellier (FR); Centre National de la Recherche Scientifique (CNRS), Paris (FR)

(72) Inventors: Thierry Taliercio, Jacou (FR); Laurent Cerutti, Saint Jean de Vedas (FR)

(73) Assignees: Universite De Montpellier; Centre National de la Recherche Scientifique (CNRS)

( * ) Notice: Subject to any disclaimer, the term of this patent is extended or adjusted under 35 U.S.C. 154(b) by 0 days.

(21) Appl. No.: 16/347,859

(22) PCT Filed: Oct. 23, 2017

(86) PCT No.: PCT/EP2017/076993
§ 371 (c)(1),
(2) Date: May 7, 2019

(87) PCT Pub. No.: WO2018/086849
PCT Pub. Date: May 17, 2018

(65) Prior Publication Data
US 2019/0310191 A1    Oct. 10, 2019

(30) Foreign Application Priority Data
Nov. 8, 2016   (FR) ........................................ 1660806

(51) Int. Cl.
  *G01N 21/552*   (2014.01)
  *G01N 21/25*    (2006.01)
(Continued)

(52) U.S. Cl.
CPC ......... *G01N 21/554* (2013.01); *G01N 21/255* (2013.01); *G01N 21/553* (2013.01); *G01N 21/7743* (2013.01); *H01Q 21/24* (2013.01)

(58) Field of Classification Search
CPC .. G01N 21/554; G01N 21/553; G01N 21/255; G01N 21/7743; G01N 21/35;
(Continued)

(56) References Cited

U.S. PATENT DOCUMENTS 6,914,279 B2 * 7/2005 Lu ........................ C12Q 1/6825
                                                        257/252
8,279,444 B2 * 10/2012 Boukherroub ...... C23C 16/0281
                                                        356/445
(Continued)

FOREIGN PATENT DOCUMENTS

WO    2006007446 A2    1/2006
WO    2006010133 A2    1/2006

OTHER PUBLICATIONS

Zhu Ay, Yi F, Reed JC, Cubukcu E. Cavity-enhanced mid-infrared absorption in perforated graphene. Journal of Nanophotonics, Society of Photo-Optical Instrumentation Engineers. Jan. 1, 2014;8(1): p. 83888; XP060047946.
(Continued)

*Primary Examiner* — Mohamed K Amara
(74) *Attorney, Agent, or Firm* — Lerner, David, Littenberg, Krumholz & Mentlik, LLP

(57) ABSTRACT

The invention relates to a method and device for detecting the presence of specific molecules, comprising, one on top of the other, a first substrate layer, a second reflective layer and a third dielectric layer. The invention is characterized by an antenna array with conductive parts, repeating in one direction, the network forming a plasmonic resonator that can be brought into contact with the molecules and arranged so as to emit at least one thermal radiation peak correspond-
(Continued)

Figure 1:
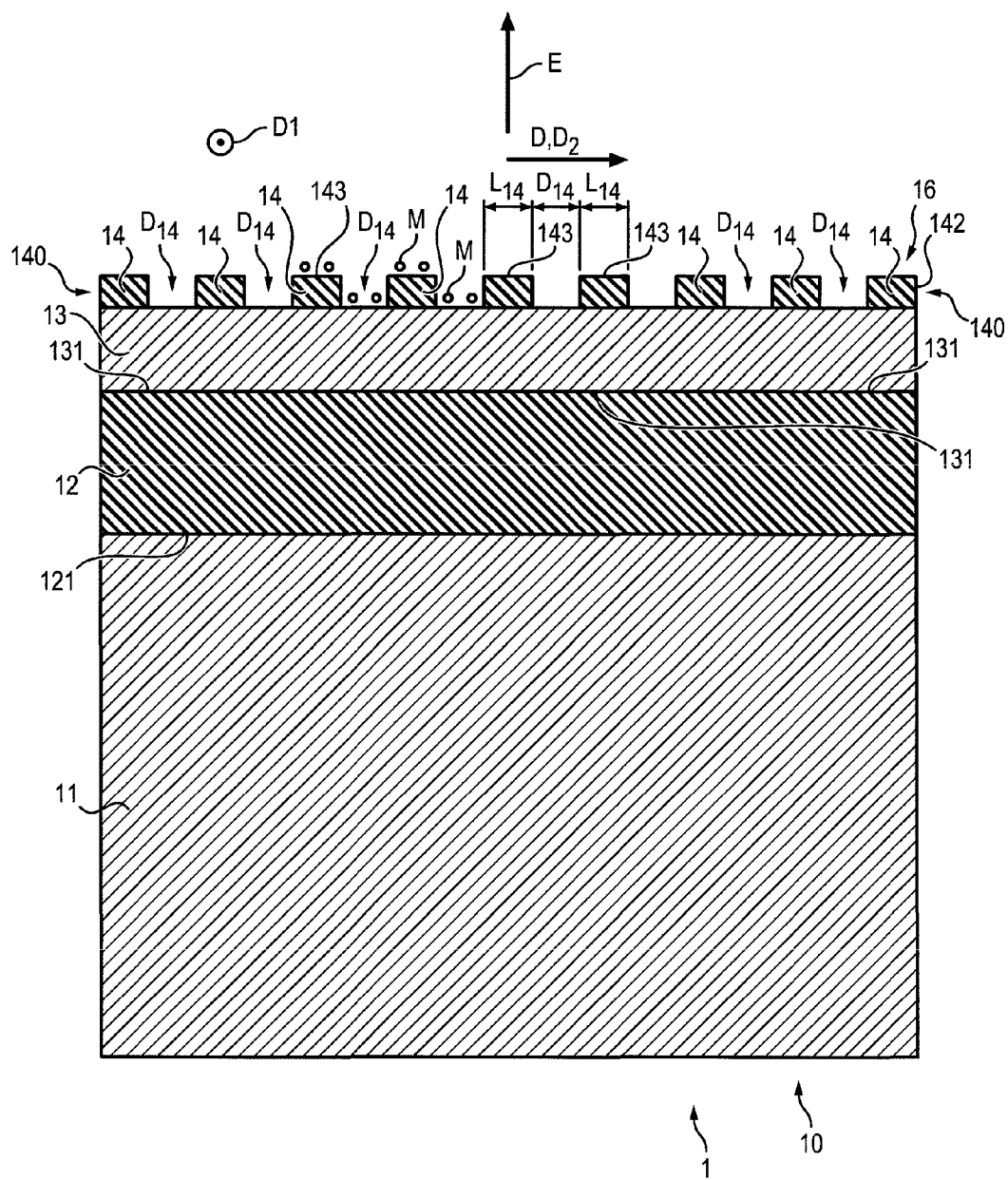

ing to at least one natural mode of thermal vibration of the specific molecules.

13 Claims, 4 Drawing Sheets

(51) Int. Cl.
*G01N 21/77* (2006.01)
*H01Q 21/24* (2006.01)

(58) Field of Classification Search
CPC ....... G01N 2291/0256; G01N 27/4145; G01N 29/022; G01N 29/036; G01N 33/54373; H01Q 21/24; B82Y 15/00; B82Y 40/00; H01L 29/1606; H01L 29/78684
See application file for complete search history.

(56) References Cited

U.S. PATENT DOCUMENTS

| | | | |
|---|---|---|---|
| 8,492,727 B1* | 7/2013 | Brown | G01J 3/42 250/370.07 |
| 8,767,207 B2* | 7/2014 | Benisty | B82Y 15/00 356/336 |
| 9,476,827 B2* | 10/2016 | Ozanam | G01N 21/554 |
| 9,784,986 B2* | 10/2017 | Shagam | C23C 14/34 |
| 9,846,125 B2* | 12/2017 | Walavalkar | G01N 21/658 |
| 9,863,880 B2* | 1/2018 | Rothberg | G01N 21/7746 |
| 9,863,885 B2* | 1/2018 | Zaretski | C23C 14/18 |
| 9,964,494 B1* | 5/2018 | Poole | G01N 21/554 |
| 9,995,623 B2* | 6/2018 | Walters | G01J 3/0289 |
| 10,520,442 B2* | 12/2019 | Kang | G03F 7/00 |
| 10,527,494 B2* | 1/2020 | Park | C23C 14/18 |
| 2009/0086201 A1* | 4/2009 | Dluhy | G01N 33/56911 356/301 |
| 2009/0303472 A1* | 12/2009 | Zhao | C12Q 1/689 356/301 |
| 2011/0212512 A1* | 9/2011 | Wang | G01N 21/658 435/288.7 |
| 2011/0275912 A1* | 11/2011 | Boyden | A61L 2/08 600/309 |
| 2012/0086021 A1* | 4/2012 | Wang | G01N 21/658 257/84 |
| 2013/0148194 A1* | 6/2013 | Altug | G02B 5/008 359/350 |
| 2013/0323858 A1* | 12/2013 | Abdulhalim | G01N 21/554 436/501 |
| 2014/0103298 A1* | 4/2014 | Lee | G01K 7/22 257/29 |
| 2014/0224989 A1* | 8/2014 | Long | G02F 1/0126 250/338.4 |
| 2014/0264026 A1 | 9/2014 | Brown et al. | |
| 2015/0139856 A1* | 5/2015 | Yamada | G01N 21/648 422/69 |
| 2016/0123973 A1 | 5/2016 | Cubukcu et al. | |
| 2016/0178516 A1* | 6/2016 | Abdulhalim | G01N 21/554 356/364 |
| 2017/0254751 A1* | 9/2017 | Zhang | G01N 21/554 |
| 2018/0047856 A1* | 2/2018 | Cai | H01L 31/1804 |
| 2018/0143131 A1* | 5/2018 | Choi | G01N 21/3586 |
| 2018/0180545 A1* | 6/2018 | Muramatsu | G01N 21/64 |
| 2018/0202928 A1* | 7/2018 | Abdulhalim | G01N 21/4788 |

OTHER PUBLICATIONS

International Search Report for PCT/EP2017/076993 dated Feb. 1, 2018.

* cited by examiner

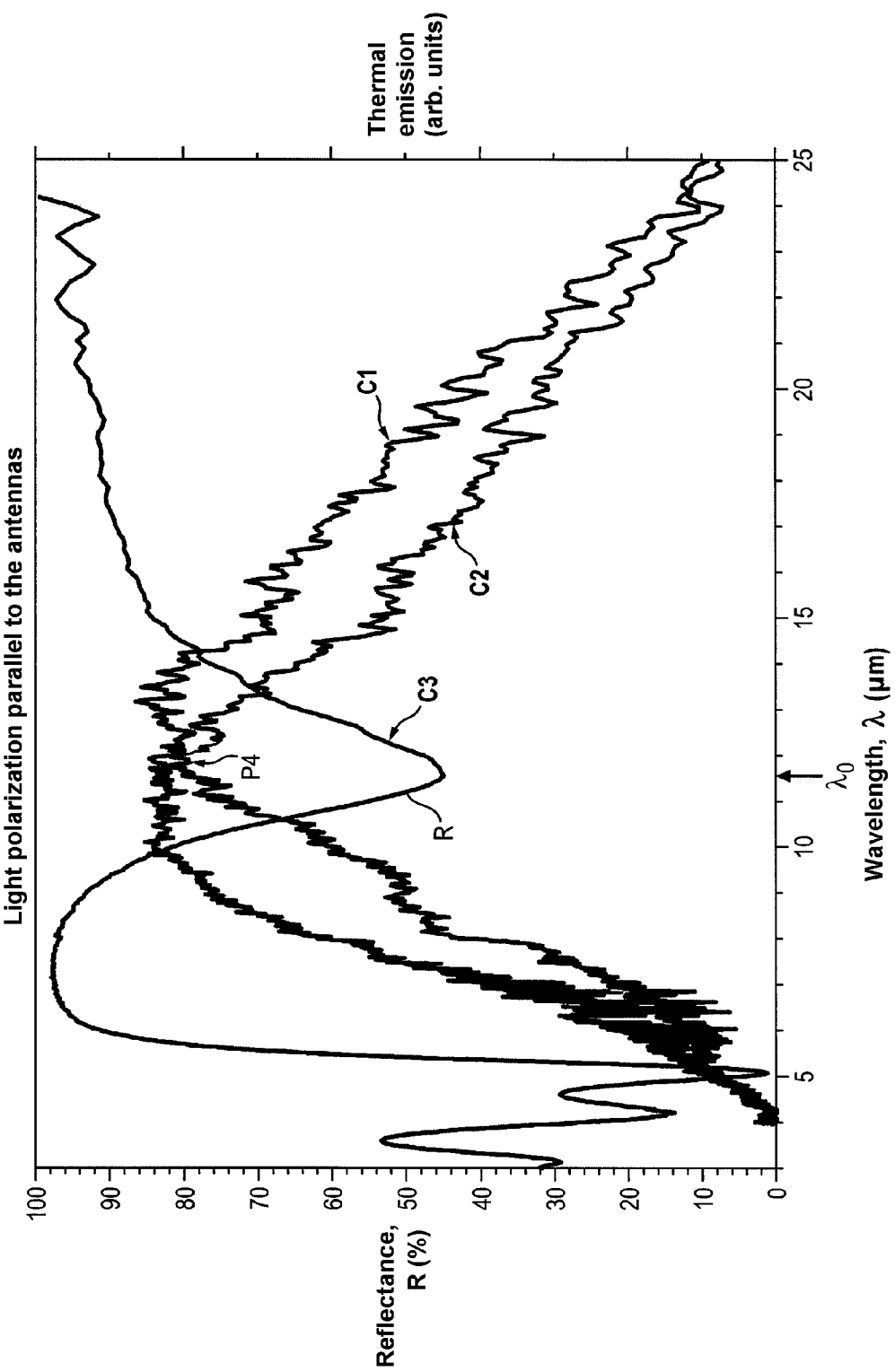

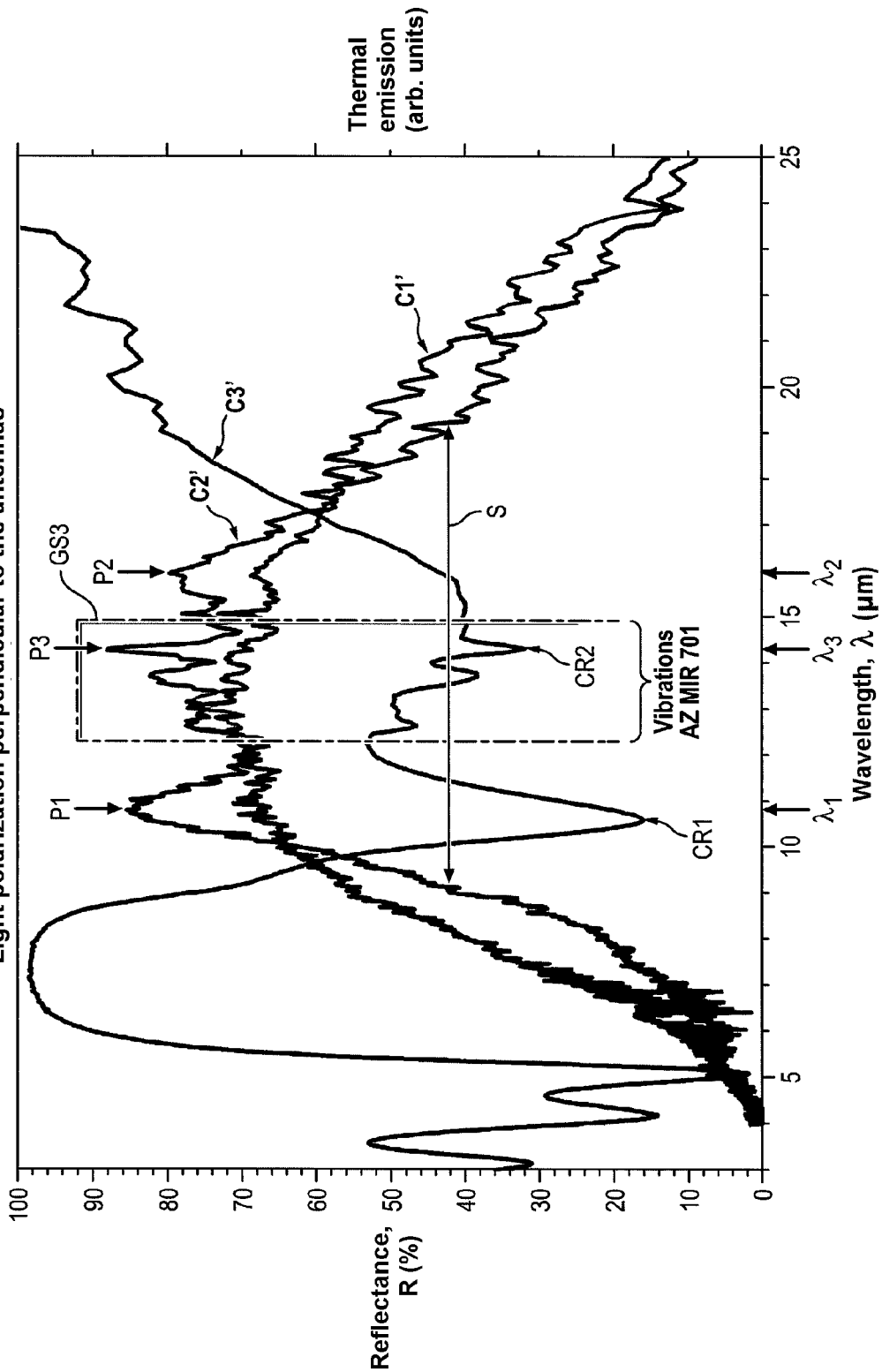

DEVICE AND METHOD FOR DETECTING THE PRESENCE OF DETERMINED MOLECULES, AND BIOSENSOR

CROSS-REFERENCE TO RELATED APPLICATIONS

The present application is a national phase entry under 35 U.S.C. § 371 of International Application No. PCT/EP2017/076993, filed Oct. 23, 2017, which claims priority from French Patent Application No. 1660806, filed Nov. 8, 2016, all of which are incorporated herein by reference.

The invention concerns a device for detecting the presence of specific molecules.

One area of application of the invention concerns the sensors used to detect the presence of certain molecules.

The document US-A-2014/0 264 026 describes a device for detecting the presence of specific molecules comprising, one on top of the other, a first substrate layer, a second reflective layer, a third dielectric layer and fourth antennas forming with the third layer at least one plasmonic resonator. This device uses incident infrared light to operate.

The document WO 2006/0 10 133 describes an infrared emitter using a photonic crystal structure to produce electromagnetic emissions in a narrow wavelength band. It comprises a semiconductor layer, a dielectric layer overlying the semiconductor layer and a metal layer overlying the dielectric layer. To operate, this device requires that the semiconductor layer be connected to an energy source, such as a resistive heater in the semiconductor layer, for example.

The document WO 2006/00 74 46 also describes an infrared emitter that requires a layer of semiconductors of its structure to be coupled to an energy source to operate.

The disadvantage of these known devices is that they require an external energy source to emit radiation.

The invention aims to obtain a device for detecting the presence of specific molecules and emitting radiation only from the vibrations of the specific molecules when they are in contact therewith.

To that end, a first object of the invention is a method for detecting the presence of specific molecules, wherein use is made of a detection device comprising, one on top of the other:
  at least a first substrate layer,
  at least a second reflective layer,
  at least a third dielectric layer,
  characterized in that the detection device comprises at least one antenna array for transmitting and/or receiving electromagnetic radiation, comprising electrically conductive parts, which extend in at least a first direction of extension on the third dielectric layer and which are repeated by being spaced from each other by intervals on the third dielectric layer with a defined spatial period of repetition following at least a defined second direction of repetition on the third dielectric layer,
  the antenna array forming with the third dielectric layer and the second reflective layer at least one plasmonic resonator,
  the plasmonic resonator of the detection device is brought into contact with the specific molecules,
  a spectrometer is used to measure the spectrum of the electromagnetic radiation emitted by the detection device when the molecules are in contact with the plasmonic resonator, in order to detect at least a third thermal radiation peak, which is emitted by the detection device and which corresponds to at least one natural mode of thermal vibration of the specific molecules, the third peak being located in at least a third wavelength.

A second object of the invention is a device for detecting the presence of specific molecules, comprising, one on top of the other:
  at least a first substrate layer,
  at least a second reflective layer,
  at least a third dielectric layer,
  characterized in that it comprises at least one antenna array for transmitting and/or receiving electromagnetic radiation, comprising electrically conductive parts, which extend in at least a first direction of extension on the third dielectric layer and which are repeated by being spaced from each other by intervals on the third dielectric layer with a defined spatial period of repetition following at least a defined second direction of repetition on the third dielectric layer,
  the antenna array forming with the third dielectric layer and the second reflective layer at least one plasmonic resonator, capable of being brought into contact with the specific molecules and arranged to emit at least a third thermal radiation peak corresponding to at least one natural mode of thermal vibration of the specific molecules, the third peak being located in at least a third wavelength.

Thanks to the invention, the structure of the device is designed so that the antenna(s) cause the spontaneous emission of additional radiation to the outside by the molecules, at the third wavelength(s). This spontaneous emission is generated by coupling the specific molecules with the plasmonic resonator. The structure of the device is designed to enhance the thermal emission of the molecules, which will emit this additional radiation. This emission of additional radiation to the outside does not require lighting by incident external radiation providing energy, nor heating from the outside, nor generally energy inputs from an external energy source. The energy source is the heat of the device itself and of the molecules maintained at room temperature (blackbody radiation). The additional radiation emitted to the outside is characteristic of the specific molecules brought into contact with the device and therefore makes it possible to detect them. Thus, when the device does not emit any additional radiation to the outside, it can be concluded that there is no specific molecule on the device. Conversely, when the device emits the additional radiation to the outside, it can be concluded that the specific molecules are present on the device.

According to one embodiment of the invention, the second reflective layer, the third dielectric layer and the plasmonic resonator form a means of enhancing the thermal radiation of the specific molecules at the third wavelength ($\lambda_3$).

According to one embodiment of the invention, the plasmonic resonator is structured to have at least first and second main resonance peaks in polarization of the electromagnetic radiation in the second direction of repetition,
  the first peak being located in a first wavelength, the second peak being located in a second wavelength.

According to one embodiment of the invention, the third wavelength is located between the first wavelength and the second wavelength and/or within a resonant bandwidth of the first peak and/or second peak.

According to one embodiment of the invention, the plasmonic resonator is structured to have at least a fourth resonance peak in polarization of the electromagnetic radiation parallel to the first direction of the antenna, the fourth first peak being located in a fourth wavelength $\lambda_0$.

According to one embodiment of the invention, the device is structured to have at least a fourth resonance peak in polarization of the electromagnetic radiation parallel to the first direction of the antenna, the fourth peak being located in a fourth wavelength $\lambda_0$, located between the first wavelength and the second wavelength.

According to one embodiment of the invention, the third dielectric layer has a thickness $e_3$, which is greater than or equal to $(2 \cdot N+1) \cdot \lambda_0/(4 \cdot n_3) - 200$ nm and which is less than or equal to $(2 \cdot N+1) \cdot \lambda_0/(4 \cdot n_3)$, where N is a natural, positive or null integer, and where $n_3$ is the refractive index of the third layer.

According to one embodiment of the invention, the third dielectric layer has a thickness $e_3$, which is greater than or equal to $(2 \cdot N+1) \cdot \lambda_0/(4 \cdot n_3) - 100$ nm and which is less than or equal to $(2 \cdot N+1) \cdot \lambda_0/(4 \cdot n_3)$, where N is a natural, positive or null integer, and where $n_3$ is the refractive index of the third layer.

According to one embodiment of the invention, the third dielectric layer has a thickness $e_3$, which is greater than or equal to $(2 \cdot N+1) \cdot \lambda_0/(4 \cdot n_3) - 50$ nm and which is less than or equal to $(2 \cdot N+1) \cdot \lambda_0/(4 \cdot n_3)$, where N is a natural, positive or null integer, and where $n_3$ is the refractive index of the third layer.

According to one embodiment of the invention, the third dielectric layer has a thickness $e_3$, equal to $(2N+1) \cdot \lambda_0/(4 \cdot n_3)$, where N is a natural, positive or null integer, and where $n_3$ is the refractive index of the third layer.

According to one embodiment of the invention, the third dielectric layer has a thickness $e_3$ equal to $(2N+1) \cdot \lambda_0/(4 \cdot n_3) - e_{P2}$, where N is a natural, positive or null integer, where $n_3$ is the refractive index of the third layer, and where $e_{P2}$ is the skin thickness of the second reflective conductive layer.

According to one embodiment of the invention, N=0.

According to one embodiment of the invention, the defined spatial period of the periodic array of identical parts of the antennas is preferentially less than the wavelength $\lambda_0$.

According to one embodiment of the invention, on the plasmonic resonator is a fifth functionalization layer for adsorbing and/or absorbing the specific molecules.

According to one embodiment of the invention, the third wavelength ($\lambda_3$) is greater than or equal to 2 μm and less than or equal to 20 μm.

According to one embodiment of the invention, the second reflective layer is electrically conductive.

According to one embodiment of the invention, the device also comprises a spectrometer for measuring the spectrum of electromagnetic radiation emitted when the specific molecules are in contact with the plasmonic resonator.

A third object of the invention is a biosensor having a device for detecting specific molecules as described above.

Figure 2:
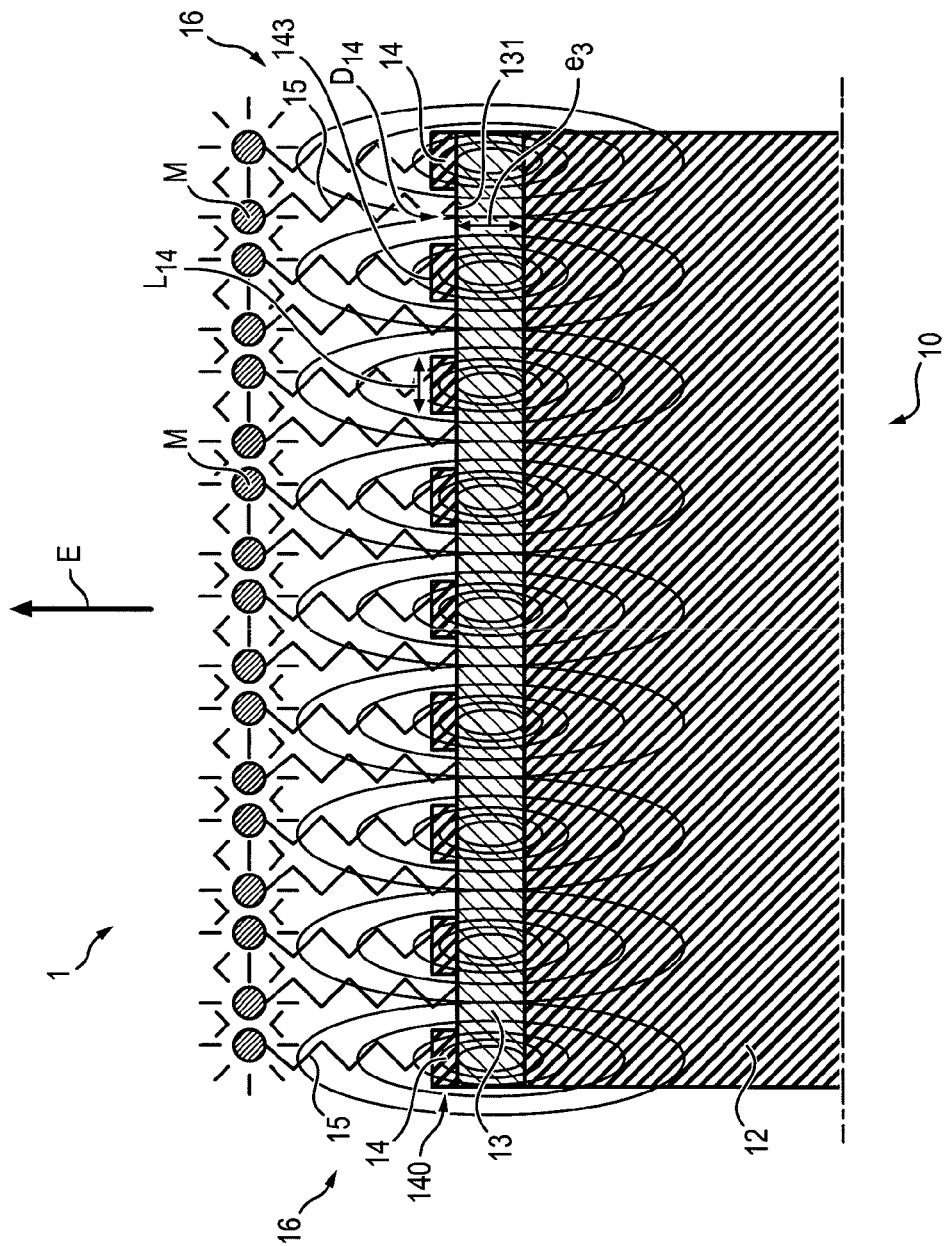

The invention will be better understood by reading the following description given by way of non-limiting example only, with reference to the attached drawings, on which:

FIG. 1 shows in vertical schematic section one embodiment of the detection device according to the invention, FIG. 2 shows in vertical schematic section another embodiment of the detection device according to the invention, FIGS. 3 and 4 represent an example of spectra of the electromagnetic radiation and the reflectance of the detection device according to the invention, in a use case, as a function of wavelength, according to two different polarizations, respectively.

In the figures, the device 1 for detecting the presence of specific molecules M according to the invention has a first substrate layer 11 on which is located a second reflective or mirror layer 12. On the second reflective layer 12 is a third dielectric layer 13. One or more substrate layers 11 (hereinafter referred to as layer 11) may be provided. One or more reflective layers 12 (hereinafter referred to as layer 12) may be provided. One or more dielectric layers 13 (hereinafter referred to as layer 13) may be provided.

On the third dielectric layer 13 is an antenna array 14. Each antenna 14 protrudes from the third dielectric layer 13. The antennas 14 together with the underlying third layer 13 and the second reflective layer 12 form at least one plasmonic resonator 140. One or more plasmonic resonator(s) 140 (hereinafter referred to as plasmonic resonator 140) may be provided. The plasmonic resonator 140 is for example a plasmonic array 140.

Molecules are brought into contact with the device 1, namely with the plasmonic resonator 140, to detect whether specific molecules M are present therein. These molecules can be contained in any substance, whether chemical, biological or other.

According to one embodiment, the plasmonic resonator is arranged to emit to the outside at least a third thermal radiation peak P3 corresponding to at least one natural mode of thermal vibration of the specific molecules, the third peak P3 being located in at least a third wavelength $\lambda_3$.

According to one embodiment, the third layer 13 is structured so that the plasmonic resonator 140 in contact with the specific molecules M causes a spontaneous emission of electromagnetic radiation E.

The antennas 14 are used to transmit and/or receive electromagnetic radiation. The antennas 14 have electrically conductive parts 143, which extend in a first direction D1 of extension over the third dielectric layer 13. The antennas 14 are repeated by being spaced from each other by intervals $D_{14}$ on the third dielectric layer 13 with a defined spatial period $(D_{14}, L_{14})$ of repetition in a second determined direction D, D2 of repetition on the third dielectric layer 13.

According to one embodiment, the second direction D, D2 can be secant to the first direction D1 of extension and for example perpendicular to the first direction D1 of extension.

According to one embodiment, the plasmonic resonator 140 is structured to have at least a first main resonance peak P1 in polarization of the electromagnetic radiation in the second direction D, D2 of repetition and at least a second main resonance peak P2 in polarization of the electromagnetic radiation in the second direction D, D2 of repetition.

An example of these peaks P1 and P2 is shown in FIG. 4. FIGS. 3 and 4 are given in the example where the specific molecules M are PMMA (polymethylmethacrylate). In the example in FIG. 4, the first P1 is located at a first wavelength $\lambda_1$=10.8 μm, the second peak P2 is located at a second wavelength $\lambda_2$=15.9 μm. Of course, the first and second peaks P1 and P2 can be located at first and second wavelengths $\lambda_1$ and $\lambda_2$ other than those in FIG. 4.

The specific molecules have at least a third thermal radiation peak P3 corresponding to at least one natural mode of thermal vibration. The third peak P3 is located in one or more predetermined third wavelengths $\lambda_3$.

According to one embodiment, the plasmonic resonator 140 is arranged so that the third wavelength $\lambda_3$ is located between the first wavelength $\lambda_1$ of the first peak P1 and the second wavelength $\lambda_2$ of the second peak P2 or in a resonance bandwidth (in polarization of the electromagnetic radiation in the second direction D, D2 of repetition) of the first peak P1 around the first wavelength $\lambda_1$ or in a resonance bandwidth (in polarization of the electromagnetic radiation along the second direction D, D2 of repetition) of the second peak P2 around the second wavelength $\lambda_2$. The resonant bandwidth of the first peak P1 corresponds to emission intensities greater than or equal to half the luminous intensity of the first peak P1. The resonant bandwidth of the second peak P2 corresponds to emission intensities greater than or equal to half the luminous intensity of the second peak P2.

In the example in FIG. 4, the third peak P3 is located at the third wavelength $\lambda_3$=14.3 μm. Of course, the third peak P3 can be located at a different third wavelength $\lambda_3$ than that of FIG. 4. In the example in FIG. 4, there are several third peaks P3 located in the spectral range GS3 from 12 to 15 μm. In the example in FIG. 4, the sum S of the interval between the first wavelength $\lambda_1$ of the first peak P1 and the second wavelength $\lambda_2$ of the second peak P2, the resonant bandwidth of the first peak P1 around the first wavelength $\lambda_1$ and the resonant bandwidth of the second peak P2 around the second wavelength $\lambda_2$ ranges from 9 μm to 19.2 μm.

According to one embodiment, the third dielectric layer 13 has a defined thickness $e_3$ between the second reflective layer 12 and an interface 131 with the antennas 14. This interface 131 is an interface 131 located between the antenna(s) 14 and the third dielectric layer 13. This interface 131 forms, for example, the upper surface of the third dielectric layer 13. This upper surface 131 of the third dielectric layer 13 is separated from the lower surface 121 of the third dielectric layer 13 by the thickness $e_3$. This lower surface 121 of the third dielectric layer 13 is in contact with the second reflective layer 12. According to one embodiment, the thickness $e_3$ of the third dielectric layer 13 is defined to cause an electric field antinode (i.e. a maximum electric field) at the interface 131 for the defined resonance wavelength $\lambda_0$, when the specific molecules M are in contact with the plasmonic resonator 140.

According to one embodiment, the second reflective layer 12, the third dielectric layer 13 and the antenna array 14 are structured to have a fourth resonance peak P4 in polarization of the electromagnetic radiation parallel to the first direction D1 of extension of the antennas 14. According to one embodiment, the second reflective layer 12, the third dielectric layer 13 and the antenna array 14 are structured so that this fourth first peak P4 is located in a fourth wavelength $\lambda_0$, located between the first wavelength $\lambda_1$ and the second wavelength $\lambda_2$. In the example in FIG. 4, the fourth peak P4 is located at the fourth wavelength $\lambda_0$=11.5 μm. Of course, the fourth peak P4 can be located at a fourth wavelength $\lambda_0$ other than that of FIG. 3. The stacking of the first, second and third layers 11, 12, 13 corresponds to an optical cavity, giving rise to resonances.

According to one embodiment, the third dielectric layer 13 has a thickness $e_3$,
which is greater than or equal to $(2 \cdot N+1) \cdot \lambda_0/(4 \cdot n_3)-200$ nm
and which is less than or equal to $(2 \cdot N+1) \cdot \lambda_0/(4 \cdot n_3)$,
where N is a natural, positive or null integer,
where $\lambda_0$ is the fourth wavelength of the fourth peak P4,
and where $n_3$ is the refractive index of the third layer 13.

The width of this thickness range allows for the skin thickness of the second reflective layer 12 to be taken into account.

N can be equal to 0, 1, 2, 3, . . . .

According to one embodiment, the third dielectric layer 13 has a thickness $e_3$,
which is greater than or equal to $(2 \cdot N+1) \cdot \lambda_0/(4 \cdot n_3)-100$ nm
and which is less than or equal to $(2 \cdot N+1) \cdot \lambda_0/(4 \cdot n_3)$,
where N is a natural, positive or null integer,
and where $n_3$ is the refractive index of the third layer 13.

According to one embodiment, the third dielectric layer 13 has a thickness $e_3$,
which is greater than or equal to $(2 \cdot N+1) \cdot \lambda_0/(4 \cdot n_3)-50$ nm
and which is less than or equal to $(2 \cdot N+1) \cdot \lambda_0/(4 \cdot n_3)$,
where N is a natural, positive or null integer,
and where $n_3$ is the refractive index of the third layer 13.

According to one embodiment, the third dielectric layer 13 has a thickness $e_3$, equal to $(2 \cdot N+1) \cdot \lambda_0/(4 \cdot n_3)$,
where N is a natural, positive or null integer,
and where $n_3$ is the refractive index of the third layer 13.

According to one embodiment, the third dielectric layer 13 has a thickness $e_3$ equal to $(2 \cdot N+1) \cdot \lambda_0/(4 \cdot n_3)-e_{P2}$,
where N is a natural, positive or null integer,
where $n_3$ is the refractive index of the third layer 13,
and where $e_{P2}$ is the skin thickness of the second reflective conductive layer 12 at the wavelength $\lambda_0$.

For example, N=0 in either one of the above-mentioned embodiments.

For example, the third layer 13 has a thickness at $e_3$ equal to $\lambda_0/(4 \cdot n_3)$. This example corresponds to the case N=0 in the preceding embodiments.

According to one embodiment, the third dielectric layer 13 can form a quarter-wave plate or a quarter-wave layer.

According to one embodiment, the second reflective layer 12, the third dielectric layer 13 of thickness $e_3$ and the plasmonic resonator 140 form a means of enhancing the thermal radiation E of the specific molecules at the third wavelength $\lambda_3$ in the two configurations in FIGS. 1 and 2. The second reflective layer 12, the third dielectric layer 13 of thickness $e_3$ and the plasmonic resonator 140 are arranged as described above, which allows them to enhance thermal radiation E of the specific molecules at the wavelength $\lambda_3$.

The positioning of the plasmonic resonators 140 at the indicated distance $e_3$ above with respect to the second reflective layer 12 allows them to be effectively coupled to the wave (the incident wave being constituted by thermal emission of electromagnetic radiation of the molecules M at the wavelength $\lambda_0$) reflected by the second layer 12, which thus transforms the plasmonic resonators 140 into perfect absorbers. The advantage of the structure of the plasmonic resonator 140 is to locate the electric field maxima at the lower ends of the plasmonic array 140 or plasmonic resonator 140, i.e. at the interface 131. In the case where the molecules M are deposited on the surface 16 of the device 1, a strong interaction takes place with the electromagnetic field around the plasmonic resonator 140. The molecules M absorb light, causing spectral resonances to appear in the reflectivity spectrum (FIG. 4) or become effective emitters (FIG. 3). In the embodiment shown in FIG. 1, the fourth antenna(s) 14 and the interval(s) $D_{14}$ of the third layer 13 are used to absorb and/or adsorb the specific molecules M to be detected (hereinafter referred to as molecules M). In this case, the outer surface 16 of the device 1 is formed by the fourth antenna 14 and the third layer 13. In this case, the molecules M are brought into contact with the antennas 14 and the third dielectric layer 13 in the intervals $D_{14}$ between the antennas 4.

In another embodiment represented in FIG. 2, on the plasmonic resonator 140, i.e. on the fourth layer 142 and/or on the antenna(s) 14 and/or on the interval(s) $D_{14}$, located on the third layer 13 between several antennas 14, there is a fifth functionalization layer 15, increasing an adsorption of the specific molecules M and/or an absorption of the specific molecules M. In this case, the outer surface 16 of the device 1 is formed by the fifth functionalization layer 15. In this case, the molecules M are brought into contact with the fifth functionalization layer 15.

The device 1 according to the invention causes an enhanced thermal emission of electromagnetic radiation E of the molecules absorbed or adsorbed on the surface 16 of the device 10. This enhanced thermal emission of electromagnetic radiation E is due to the structure and/or components of the device 1, which are mentioned and which are predetermined to correspond to the specific molecules M to be detected. The detection of the molecules M is carried out by making a direct measurement of the emission field E of the device 1 covered with these molecules M. The advantage is that no infrared light source (sending incident radiation on the device) is required to detect the presence of the molecules M, since they emit by themselves a characteristic electromagnetic signal E, which is enhanced by the device 1 to be detectable in itself by another radiation measuring device (spectrometer or others) capable of receiving this signal E, having been emitted by the device 1. This makes it possible to consider the development of systems 1 for detecting chemical species M, which are more compact (transportable), less energy consuming but perform as well as those described in the above-mentioned documents of the state of the art. The antenna(s) 14 and/or plasmonic resonator(s) can form nanostructures adapted to exploit the thermal energy of the molecules M and use it for its detection via enhanced emission.

According to one embodiment, the device 1 further comprises a measurement spectrometer for measuring the spectrum of electromagnetic radiation emitted when the specific molecules M are in contact with the plasmonic resonator 140.

According to one embodiment, the device 1 is part of a biosensor 10.

A method for detecting specific molecules can use the device 1 as follows. In this method, the third thermal radiation peak P3 is detected, which is emitted by the detection device 1 and corresponds to at least one own mode of thermal vibration of the specific molecules at the at least one third predetermined wavelength $\lambda_3$.

In a first step, the plasmonic resonator 140 of the device 1 is brought into contact with molecules.

Then, in a second step, a spectrometer is used to measure the spectrum of the electromagnetic radiation emitted by the detection device 1 when the specific molecules M are in contact with the plasmonic resonator 140.

Then, in a third step, it is possible to evaluate the presence of the specific molecules M on the detection device 1 by the presence of one or more third peaks P3 at the wavelength $\lambda_3$ or around the wavelength $\lambda_3$ in the spectrum.

For example, to detect the molecules M, the emission received from a first zone of the surface 16 without the molecules M is compared with the emission E from a second zone of the surface 16 with the molecules M. The emission E corresponds to the spectral signature of the molecules M, allowing them to be identified without ambiguity. Since the plasmonic resonators 140 are sensitive to the variation of the refractive index, the presence of the molecules M can be verified by the spectral shift of the resonances. In this case, identification will not be possible, but detection will. The device 1 can be used on an infrared microscopy device working in reflection. Indeed, the spectral signature is quite visible in this configuration (see FIG. 3).

The device 1 emits electromagnetic radiation E at the third wavelength $\lambda_3$ or around the third wavelength $\lambda_3$, for example from 50% of $\lambda_3$ to 150% of $\lambda_3$. The choice of the third wavelength $\lambda_3$ depends on the chemical composition of the molecules M.

According to one embodiment, the third wavelength $\lambda_3$ is infrared. According to one embodiment, the third wavelength $\lambda_3$ is greater than or equal to 2 μm and less than or equal to 20 μm (which corresponds to a frequency greater than or equal to 15 THz and less than or equal to 150 THz). For example, the wavelength $\lambda_3$ is in a wavelength range greater than or equal to 12 μm and less than or equal to 15 μm. The central wavelength $\lambda_3$ is influenced only by the choice of molecules M to be studied.

According to one embodiment, the first substrate layer 11 is electrically non-conductive. According to one embodiment, the first substrate layer 11 is made of one or more semiconductor materials. According to the example described below, the first substrate layer 11 is of GaSb. The substrate layer 11 can have a thickness greater than or equal to 300 μm and less than or equal to 400 μm. This layer 11 is used to mechanically support the entire structure. Of course, the first substrate layer 11 can be made of another material.

According to one embodiment, the second reflective layer 12 is electrically conductive.

According to one embodiment, each antenna 14 is electrically conductive. According to one embodiment, each antenna 14 has a conductivity greater than or equal to $10^{-8}$ S·m$^{-1}$ and less than or equal to $10^{-1}$ S·m$^{-1}$. According to one embodiment, the second reflective layer is composed of one or more first semiconductor materials, highly doped with at least one second semiconductor material (with positive or negative charges) other than the first semiconductor material(s), to have a metallic behavior and therefore be electrically conductive. For example, these first semiconductor materials may be an $InAs_{0.91}Sb_{0.09}$ or more generally InAsSb-based alloy. According to one embodiment, this doping in second semiconductor material can be silicon. According to one embodiment, the mesh parameter of the second layer 12 is matched to that of the substrate layer 11. This avoids degrading the optical properties of the materials and allows optimal performance to be achieved. The doping is chosen in such a way as to be adapted to the expected optical properties. The layer 12 and/or 14 can be made of a degenerate (very highly doped) semiconductor. The advantage of having very highly doped semiconductors is to have a high flexibility on the geometric and plasmonic parameters (via the doping level) of the antennas 14 and to allow low-cost industrialization via microelectronics techniques. According to one embodiment, this doping is greater than or equal to $10^{19}$ cm$^{-3}$ or $10^{19}$ cm$^{-3}$ and less than or equal to some $10^{20}$ cm$^{-3}$ or less than or equal to $7 \cdot 10^{19}$ cm$^{-3}$. In the above example, the doping in Si is $5 \cdot 10^{19}$ cm$^{-3}$ so as to bring the plasma frequency of the mirror layer 12 and that of the plasmonic resonators 14 around 5.5 μm. The highly doped InAsSb of the second layer 12 has a metallic behavior. The thickness of the second layer 12 can be greater than or equal to 500 nm (for example equal 1 μm), to allow total reflection of the incident wave. In another embodiment, the second reflective layer is composed of one or more first metallic materials. According to one embodiment, the skin thickness $e_{P2}$ of the second reflective layer 12 is given by the following formula:

$$\delta = (2/(\omega \cdot \mu_0 \cdot \sigma))^{-1/2},$$

where $\delta$ is the skin thickness $e_{P2}$, where $\omega$ is the pulsation, $\mu_0$ is the vacuum permeability ($4\pi\ 10^{-7}$ H/m) and is the electrical conductivity.

The third dielectric layer 13 is electrically insulating. According to one embodiment, the second reflective layer is composed of one or more third semiconductor materials. For example, these third semiconductor materials may be of GaSb. In the example in FIGS. 3 and 4, the thickness $e_3$ of the third dielectric layer 13 can for example be equal to $e_3 = d_{GaSb} = \lambda_0/(4 \cdot n_{GaSb})$ for $n_3 = n_{GaSb}$. As $n_{GaSb} = 3.77$ for the wavelength range containing $\lambda_0 = 11.5$ μm, $d_{GaSb}$ is equal to 763 nm. To refine the accuracy with which the thickness of layer 13 is defined, it may be useful to consider the skin thickness $e_{P2}$ of the second layer (for example of InAsSb) at this wavelength $\lambda_0$, which is a few tens of nm, so that this skin thickness $e_{P2}$ is removed from the thickness $e_3$, according to the following formulas:

$$e_3 = d_{GaSb} = \lambda_0/(4 \cdot n_{GaSb}) - e_{P2}.$$

According to one embodiment, each antenna 14 is composed of one or more fourth semiconductor materials, highly doped with at least one fifth semiconductor material, other than the fourth semiconductor material(s) (with positive or negative charges), to have a metallic behavior and therefore be electrically conductive. For example, these fourth semiconductor materials may be made of InAsSb. According to one embodiment, this doping in fifth semiconductor material can be silicon.

In other embodiments, the layers 12 and/or 14 can include or be made of metals, such as noble metals like gold or silver. In other embodiments, the third dielectric layer may include or consist of other materials, such as $SiO_2$ and/or $Si_3N_4$, and/or others. These other embodiments can be used to target shorter wavelength ranges and therefore higher operating temperatures. Other types of semiconductors such as Si or II-VI semiconductors can be used when conditions require it (wavelength).

However, the use of semiconductors for the wavelength ranges described is the most suitable. It is of course possible to use all types of semiconductors, particularly silicon. The exemplary structure described above is made of antimony-based semiconductors to allow the use of a common substrate for infrared photonics, GaSb. The advantage of these semiconductors is that it allows perfect control of the deposited layers from the point of view of both geometry and the control of plasmonic properties via the doping of the layers 12 and 14. The use of the InAsSb/GaSb is particularly advantageous compared to the use of other metallic, semiconductor or dielectric materials for the following reasons:

Compatibility with Si substrate and dominant CMOS processes in microelectronics.

Compatibility with a GaSb substrate in mesh agreement with InAsSb to improve the quality of materials and to remain on a common platform for infrared applications (lasers and detectors). The quality of the materials reduces losses and increases enhancement phenomena.

The ability to finely control the Si doping level of InAsSb layers to add an additional degree of freedom in the sizing of the devices. This makes it possible, for example, to bring the maximum scattering of the resonator 140 to the desired working wavelength.

The possibility of obtaining connections of forbidden bands, minimizing the effects of charge transfer. This guarantees abrupt interfaces.

The effective masses of InAs and InSb are very low, which guarantees a high plasma frequency despite low carrier densities compared to conventional metals like gold and silver.

Embodiments of the plasmonic resonator 140 are described in greater detail below. Of course, the plasmonic resonator 140 can have other shapes than those described below.

When several antennas 14 are provided, the antennas 14 are spaced from each other by at least one interval $D_{14}$ provided on the third layer 13. Thus, in this or these interval(s) $D_{14}$, the third layer 13 is not covered by the material(s) of the antenna 14. The alternation of antennas 14 and intervals $D_{14}$ forms a fourth discontinuous layer 142 on the third layer 13. The fourth layer 142 supports localized plasmons.

According to one embodiment, the antennas 14 have identical conductive parts 143 repeating with the defined spatial period ($D_{14} + L_{14}$) in the defined direction D, parallel to the interface 131. These identical parts 143 are spaced at the same interval $D_{14}$ one after the other on the third dielectric layer 13. The identical parts 143 form a periodic array in the defined direction D. Each identical part 143 may or may not form the entire antenna 14.

According to one embodiment, the regular array of the identical parts 143 is repeated, for example, in two secant dimensions D1 and D2 (e.g. perpendicular) and parallel to the upper surface 131 of the third layer 13. Each antenna 14 or part 143 can take various shapes: square, cross, disc, band, stud or other.

The antennas 14 spaced on the third layer 13 can form a one-dimensional antenna array 14, i.e. the antenna 14 is repeated in the defined direction D parallel to the upper surface 131 of the third layer 13. Each antenna 14 or part 143 can take various shapes: square, cross, disc, band or other. Each antenna 14 or part 143 can be axially symmetrical with respect to the first direction D1 of extension.

According to one embodiment, the one-dimensional array consists of the repetition, in the direction D parallel to the upper surface 131 of the third layer 13, of the conductive parts 143 formed of bands 143 having a larger dimension in the first direction D1 of extension than in the second direction D, D2 of repetition. As shown by way of example in FIG. 1, each band 143 has a width $L_{14}$ in the second direction D, D2 of repetition of the array parallel to the surface 131 less than the length of the band 143 in the first direction D1 of extension of the surface 131, which is perpendicular to the second direction D, D2 of repetition. For example, the length of each band 143 is greater than or equal to at least ten times the width $L_{14}$ of the band 143, this width $L_{14}$ and this length being taken parallel to the upper surface 131 of the third layer 13. According to one embodiment, the width $L_{14}$ of a band 143 and the interval $D_{14}$ between two successive bands 143 are chosen so that the opening rate (ratio between the surface of the etched part of the upper layer 142, i.e. the antennas 14 formed by the bands 143, and the surface of the remaining part, i.e. the intervals $D_{14}$) and the period of the array guarantee the presence of at least the third absorption peak P3, due to a plasmon resonance, at the given wavelength $\lambda_3$ and a given emission angle $\theta$, non-zero, to the outside from the surface 131 of the device (collection angle of the emitted radiation with respect to the plane of the upper surface 131 of the third layer 13).

According to one embodiment, the width $L_{14}$ of the bands and the doping level of the semiconductor allow the resonance frequency of the plasmonic resonators 140 to be controlled. According to one embodiment, the bandwidth of the plasmonic resonator 140 is about 10% to 30% of the third resonance wavelength $\lambda_3$.

According to one embodiment, the defined spatial period $D_{14}$, $L_{14}$ of the periodic array of the identical parts 143 of the antennas 14 in the direction D parallel to the upper surface 131 of the third layer 13 is chosen small compared to the third wavelength $\lambda_3$. A structure almost insensitive to the collection angle is thus obtained. According to one embodiment, the defined spatial period $D_{14}$, $L_{14}$ of the periodic array of the identical parts 143 of the antennas 14 in the direction D parallel to the upper surface 131 of the third layer 13 is less than the third wavelength $\lambda_3$ or less than or equal to $\lambda_3/2$ or $\lambda_3/4$. For example, the period of the array 140 in the direction D parallel to the upper surface 131 of the third layer 13 is equal to $\lambda_3/20$ or about $\lambda_3/20$ (for example 90% of $\lambda_3/20$ to 110% of $\lambda_3/20$).

According to this embodiment, the opening rate is greater than or equal to 42% and less than or equal to 81%.

According to one embodiment, the width $L_{14}$ of each band 143 along the direction D is greater than or equal to 95 nm and less than or equal to 210 nm.

According to one embodiment, the spatial period of the antenna array 14 along the direction D parallel to the upper surface 131 of the third layer 13 is less than or equal to one-tenth of the third wavelength $\lambda_3$. This embodiment allows an insensitivity to the collection angle θ.

According to one embodiment, the thickness of each antenna 14 or band 143 is comprised between 10 and 200 nm. For example, it is equal to 100 nm.

According to one embodiment, the fifth material doping of each antenna 14 or band 143 is greater than or equal to $10^{19}$ cm$^{-3}$ and less than or equal to $9 \cdot 10^{19}$ cm$^{-3}$.

According to an exemplary embodiment, the fifth material doping of each antenna 14 or band 143 is doping greater than or equal to $10^{19}$ cm$^{-3}$ or at $10^{19}$ cm$^{-3}$ and less than or equal to $9 \cdot 10^{19}$ cm$^{-3}$ or less than or equal to $7 \cdot 10^{19}$ cm$^{-3}$. In the above example, the silicon doping is $5 \cdot 10^{19}$ cm$^{-3}$ for the fourth InAsSb material.

The fifth semiconductor material doping of each fourth antenna 14 or band 143 makes it possible to fix its plasma wavelength $\lambda_p$.

The width $L_{14}$ of each antenna 14 or band 143 in the direction D allows, with the plasma wavelength $\lambda_p$, to obtain the desired fourth wavelength $\lambda_0$.

The calculation method below makes it possible to determine the plasma wavelength $\lambda_p$ as well as the material losses of each antenna 14, and to calculate the width $L_{14}$ of each antenna 14 band 143 according to the direction D of repetition. This method is explained below in the case of the above example of materials.

The Drude model describes the response of a metallic material, permittivity, ε, to electromagnetic stimulation. It is described by the following expressions:

$$\varepsilon(\omega) = \varepsilon_\infty \left(1 - \frac{\omega_p^2}{\omega^2 + i\omega/\tau}\right) \quad (1.1)$$

with $$\omega_p = \sqrt{\frac{Ne^2}{m_{eff}\varepsilon_0 \varepsilon_\infty}} \quad (1.2)$$

and $$\tau = \mu m_{eff}/e \quad (1.3)$$

Permittivity ε is a function of the frequency ω. The different constants are the permittivity of the vacuum $\varepsilon_0$, the high-frequency dielectric constant of the material $\varepsilon_\infty$, equal to 10.4 in our case, and the charge e of the electron. For frequency ω and doping N, relaxation time τ, mobility μ and $m_{eff}$ the effective mass of the charge carriers:

$$\mu = \frac{2}{1 + \sqrt{0.25 \cdot N \cdot 10^{-17}}} (m^2 V^{-1} s^{-1}) \quad (1.4)$$

and $$m_{eff} = (0.02 + 2.3 \cdot N^{0.335} \cdot 10^{-8}) m_0 \quad (1.5)$$

with $m_0$ the mass of the electron in vacuum.

From (1.1) and (1.2) it is possible to obtain the permittivity of InAsSb as a function of ω and the plasma frequency $\omega_p$ for a given doping, N. Once $\omega_p$ is defined, the plasma wavelength $\lambda_p$ can be calculated.

The width $L = L_{14}$ of the bands can be defined from the plasma wavelength, $\lambda_p$, so that the plasmonic resonator 140 resonates at $\lambda_0$.

$$L = \frac{\lambda_0}{1.1 \cdot \lambda_p + 1.2} - \frac{1.42}{1.1 + 1.2/\lambda_p} \quad (1.6)$$

For $\lambda_0 = 11.5$ μm and $\lambda_p = 5.5$ μm, we obtain a band width of $L = L_{14} = L = 509$ nm.

At thermal equilibrium, the molecules M present on the surface 16 of the device 1 are distributed in a random and fluctuating manner over different states of vibrational energy. These fluctuations give rise to photon emissions during transitions from higher to lower energy states. This electromagnetic radiation, known as thermal radiation, exists naturally but is difficult to exploit in spectroscopy because its intensity is typically very low due to the small number of emitting molecules of interest. The device 1, whose geometric features and constituent materials give it the property of "perfect absorber" and consequently of perfect emitter, makes it possible to enhance this thermal emission signal E and make it distinguishable (or detectable in the sense of signal-to-noise). The device 1 does not provide energy but increases the emissivity of the molecules M through the coupling between the thermal radiation and the plasmonic resonance of the resonator 140.

According to one embodiment, the plasmonic resonator 140 is integrated into the device 1 forming an absorption device and therefore a perfect emission device for applications in infrared photonic biosensors. The antennas 14 absorb light. The device 1 forming a perfect absorber (absorbing almost 100% of the light in certain wavelength ranges) behaves reciprocally as a perfect emitter to enhance the emission E of the molecules M of interest in the spectral range corresponding to their spectral signatures (allowing the identification of the molecules M). The molecules M deposited in small quantities on the surface 16 of the perfect adsorber couple to the plasmonic resonator(s) 140 and become very effective radiation emitters. A thin layer of the molecules M with a thickness comprised between a few nm and a few hundred nm can be deposited. It is the molecule M that emits the radiation E just by using its thermal energy. The strong coupling with the plasmonic resonator 140 considerably increases the emissivity of the molecule M. It is therefore not necessary to use an external light source to excite the molecules M. The device 1 can be coupled to a spectrometer, for example infrared (Fourier transform, or other) to allow spectral analysis of the emission of the specific molecules M and therefore to identify the specific molecules M.

However, for the coupling between thermal emission and plasmonic resonance to be effective, the characteristic wavelengths must coincide substantially. Thus, the geometrical and material features of the device must be chosen so that plasmon resonance occurs in the vicinity of the third thermal radiation wavelength $\lambda_3$ of the molecules M of interest. However, in this case, and because the plasmonic resonator 140 is also in thermal and radiative equilibrium with its environment, the thermal radiation of the plasmonic resonator 140 is also present and enhanced around the third plasmonic resonance wavelength $\lambda_3$. Thus, the spectrum of the (thermal) radiation E emitted by the device 1 on the surface 16 of which the molecules M (for example chemical and/or biological) are ad/absorbed consists of an overlap between the spectrum of the thermal radiation of the plasmonic resonator 140 and of the thermal radiation of the ad/absorbed molecules M, each of these spectra being enhanced by plasmon resonance.

According to one embodiment, the molecules M have their own modes of vibration in the spectral range where the device 1 behaves as a perfect emitter and where the enhancement of the electromagnetic field on the surface of the plasmonic resonators 140 is sufficient, greater than 5 (in comparison to the reference source). For example, this condition is partially met in the spectral range of 9 µm to 18 µm.

An illustration of this phenomenon is given in FIG. 3, in the example of the above-mentioned resin molecules M left on the surface 16 of the device 1. FIG. 3 shows the thermal emission E (in arbitrary units on the right y-axis) detected as a function of the wavelength $\lambda$ on the x-axis in µm in light polarization parallel to the antennas 14, i.e. parallel to the first direction D1 of extension. The curve C2 in FIG. 3 corresponds to the thermal emission E with molecules M (thermal emission), having the fourth peak P4, obtained by the device 1 according to the invention. The curve C1 in FIG. 3 corresponds to the emission of a metal plate at room temperature (not corresponding to the device 1), by way of comparison. The curve C3 in FIG. 3 corresponds to the reflectance spectrum R (curve C3 in % on the left y-axis) of the device 1 in the presence of the molecules M. The peak P4 has a fourth central wavelength $\lambda_0$=11.5 µm and a width at half-height $\Delta\lambda$~3.5 µm. The width at half-height of the thermal emission C2 of the device 1 is much narrower than that of the metal plate taken as the reference sample according to the curve C1 (very imperfect blackbody).

FIG. 4 shows the thermal emission E (in arbitrary units on the right y-axis) detected as a function of the wavelength $\lambda$ on the x-axis in µm in light polarization perpendicular to the antennas 14, i.e. parallel to the second direction of repetition D2. The curve C2' in FIG. 4 corresponds to the thermal emission E with molecules M (thermal emission), having the first peak P1, the second peak P2 and the third peak P3, obtained by the device 1 according to the invention. The curve C1' in FIG. 4 corresponds to the emission of a metal plate at room temperature (not corresponding to device 1), by way of comparison. The curve C3' in FIG. 4 corresponds to the reflectance spectrum R (curve C3' in % on the left y-axis) of the device 1 in the presence of the molecules M. When the electric field of the light is oriented perpendicular to the plasmonic resonators, i.e. oriented in the second direction D, D2 of repetition, it can excite them. The optical cavity and plasmonic resonators are excited by the incident electromagnetic wave. A strong coupling effect will therefore be produced between the optical cavity and the plasmonic resonators. This results in the appearance of a second trough CR2 in reflectivity in the curve C3' in FIG. 4, in addition to a first trough CR1. It can be seen that due to the strong coupling between the optical cavity and the plasmonic resonators, the two reflectivity troughs are spectrally shifted: the trough CR1 at 10.5 µm corresponds to the peak P1, and the trough CR2 at 15 µm corresponds to the peak P2 with respect to the resonance $\lambda_0$~11.5 µm, from FIG. 3. The thermal emission C3' of the metal plate in FIG. 4 always has a very large half-height width, $\Delta\lambda$~15 µm. The thermal emission C2' of the device 1 according to the invention has the same shape as the reflectivity spectrum C3' but reversed. The minima correspond to maxima and vice-versa. The two main thermal emission peaks P1 and P2 at 10.5 µm and 15 µm are observed. However, and unlike FIG. 3, very narrow third thermal emissions peaks P3 are observed, the spectral range of which is delimited by the range GS3. These third thermal emission peaks P3 correspond to troughs in the reflectivity spectrum C3' due to the enhanced absorption of the molecules M deposited on the surface of the device 1. These thermal emission peaks P3 correspond to the thermal emission of the molecules of the material indicated above as exemplary molecules M for FIGS. 3 and 4. The spectral signature of the molecules M appears clearly in the thermal emission E of the curve C2'. The presence of molecules M ad/absorbed on the surface 16 of the device 1 modifies the total thermal emission spectrum of the device 1 (curve C2'). The peaks P3 of the curve C2' are characteristic of the molecules M detected.

According to one embodiment, for maximum absorption (greater than 98%), it is advantageous that the thickness of the intermediate dielectric layer 13 is $\lambda_0/(4n_3)$. In this configuration, the amplitude of the electromagnetic field of the light wave reflected by the lower layer 12 reaches a maximum at the upper surface 131 of the intermediate layer 13. Since the antennas 14 or bands 14 constitute the upper layer resting exactly on this same surface 131, the coupling efficiency between light and plasmonic waves thus reaches a maximum.

The perfectly absorbent plasmonic resonator 140 is used as a particularly effective thermal source. Indeed, according to Kirchhoff's law of radiation, the monochromatic absorption and emissivity coefficients are equal for any body in thermal and radiative equilibrium. Thus, since the absorption coefficient of the device 1 approaches 1 at the plasmonic resonance wavelength, the emissivity of the device 1 at this same wavelength approaches 1. Under these conditions and in the vicinity of the plasmonic resonance wavelength, the device 1 emits radiation whose flux (luminance) is exactly what a black body would emit at the equilibrium temperature of the device.

This property of perfect emission can be transferred to the specific molecules M present on the surface 16 of the device 1 or to any object or body containing the specific molecules M, provided they are small enough and close enough to the surface 16 to guarantee effective coupling with the plasmons. Thus, a polymer layer (for instance the resin in the above example in FIGS. 3 and 4), or a biological molecule (protein) ad/absorbed on the surface of the device will also become a perfect absorber and therefore a perfect thermal emitter. But in this case, the emission spectrum of these nanoscopic objects will not be continuous but will consist of peaks around the characteristic emission lines of the ad/absorbed molecules. Therefore, the thermal radiation of the molecules M ad/absorbed on the surface 16 of the device 1 will correspond to that of a black body at the equilibrium temperature of the device and of the molecules but only at particular wavelengths.

The presence of the fifth layer 15 in the embodiment in FIG. 2 improves the coupling between the molecules M of interest and the surface plasmons. This fifth extremely thin layer 15, called ad/absorption layer, offers complementary chemical terminations to the molecules M of interest in order to establish chemical bonds with the molecules M of interest. These chemical bonds can be said to be strong in the case of the establishment of covalent bonds (for example) or weak in the case of hydrogen bonds (for example). In an advantageous embodiment, this fifth ad/absorption layer 15 consists of a self-assembled monolayer, the constituent molecules of which have chemical terminations having a strong affinity for the surface materials of the device 1 (namely antennas 14 and/or intervals $D_{14}$ of the third layer 13 between antennas 14), at a first end, and a strong affinity for the molecule(s) M of interest, at another end. In an advantageous embodiment, this fifth layer 15 or self-assembled monolayer 15 is bonded only to the surface 131 of the intermediate layer 13 of the device 1 (between the patterns 14 of the upper layer) in order to bring the molecules M of interest as close as possible to the area where the electromagnetic field is most intense and to increase the efficiency of the plasmon coupling. Several deposition techniques can be considered for the production of this self-assembled monolayer, such as electrolysis, which offers many advantages in terms of price and process controllability.

The device 1 uses enhanced emission vibration spectroscopy with perfect emitter. The device 1 can be part of an infrared biosensor, and/or of a medical diagnostic device. The device for measuring the radiation E produced may be part of the device 1. The device 1 allows the molecules M to be detected using their blackbody or thermal radiation at room temperature.

The device 1 can be reused after cleaning and the measurement times are very fast (a few seconds), unlike chromatography techniques (liquid phase, HPLC, or gas phase, GPC) which have high cost, very long analysis time and low sensitivity, or immunological techniques (lateral flow, LFI, or enzyme-linked immunosorbent assay, ELISA) which are very long to implement (several hours). In addition, no signal amplifying elements are added to the molecules so that they can be detected.

The invention simplifies the way in which molecules M are detected, using the thermal emission of the molecule M itself in suitable spectral ranges.

The invention claimed is:

1. A method for detecting the presence of specific molecules without incident light, wherein use is made of a detection device comprising, one on top of the other:
   at least one first substrate layer,
   at least one second reflective layer,
   at least one third dielectric layer,
   at least one antenna array for transmitting and/or receiving electromagnetic radiation, comprising electrically conductive parts, which extend in at least a first direction of extension on the at least one third dielectric layer and which are repeated by being spaced from each other by intervals on the at least one third dielectric layer with a defined spatial period of repetition in at least a second direction of repetition defined on the at least one third dielectric layer,
   wherein the electrically conductive parts are formed of bands each having a length, which extends in the first direction of extension secant or perpendicular to the second direction of repetition, and a width, which extends in the second direction of repetition and which is less than the length of the band,
   wherein the at least one plasmonic resonator is structured to have at least one fourth resonance peak in polarization of the electromagnetic radiation parallel to the first direction of the antenna array,
   the at least one fourth first peak being located in a fourth wavelength $\lambda_0$,
   wherein the at least one third dielectric layer has a thickness $e_3$,
   which is greater than or equal to $(2 \cdot N+1) \cdot \lambda_0/(4 \cdot n_3) - 200$ nm>0
   and which is less than or equal to $(2 \cdot N+1) \cdot \lambda_0/(4 \cdot n_3)$,
   where N is a natural, positive or null integer,
   and where $n_3$ is a refractive index of the at least one third dielectric layer,
   wherein the antenna array, the at least one third dielectric layer and the at least one second reflective layer form at least one plasmonic resonator,
   wherein the method provides
   bringing the at least one plasmonic resonator of the detection device into contact with the specific molecules,
   a spectrometer to measure the spectrum of the electromagnetic radiation emitted by the detection device when the molecules are in contact with the plasmonic resonator, in order to detect at least a third thermal radiation peak, which is emitted by the detection device and which corresponds to at least one natural mode of thermal vibration of the specific molecules, the third peak being located in at least a third wavelength.

2. A device for detecting the presence of specific molecules without incident light, comprising, one on top of the other:
   at least a first substrate layer,
   at least a second reflective layer,
   at least a third dielectric layer,
   at least one antenna array for transmitting and/or receiving electromagnetic radiation, comprising electrically conductive parts, which extend in at least a first direction of extension on the at least one third dielectric layer and which are repeated by being spaced from each other by intervals on the at least one third dielectric layer with a defined spatial period of repetition in at least a second direction of repetition defined on the at least one third dielectric layer,
   wherein the electrically conductive parts are formed of bands each having a length, which extends in the first direction of extension secant or perpendicular to the second direction of repetition, and a width, which extends in the second direction of repetition and which is less than the length of the band,
   wherein the at least one plasmonic resonator is structured to have at least one fourth resonance peak in polarization of the electromagnetic radiation parallel to the first direction of the antenna array, the at least one fourth first peak being located in a fourth wavelength $\lambda_0$, wherein the at least one third dielectric layer has a thickness $e_3$, which is greater than or equal to $(2 \cdot N+1) \cdot \lambda_0/(4 \cdot n_3) - 200$ nm>0 and which is less than or equal to $(2 \cdot N+1) \cdot \lambda_0/(4 \cdot n_3)$, where N is a natural, positive or null integer, and where n3 is a refractive index of the at least one third dielectric layer, wherein the antenna array, the at least one third dielectric layer and the at least one second reflective layer form at least one plasmonic resonator, capable of being brought into contact with the specific molecules and arranged to emit at least one third thermal radiation peak corresponding to at least one natural mode of thermal vibration of the specific molecules, the at least one third thermal radiation peak being located in at least a third wavelength.

3. The device according to claim 2, wherein the at least one second reflective layer, the at least one third dielectric layer and the at least one plasmonic resonator form a means of enhancing a thermal radiation of the specific molecules at the third wavelength.

4. The device according to claim 2, wherein the at least one plasmonic resonator is structured to have at least a first main resonance peak in polarization of the electromagnetic radiation in the second direction of repetition and a second main resonance peak in polarization of the electromagnetic radiation in the second direction of repetition, the first main resonance peak being located in a first wavelength, the second main resonance peak being located in a second wavelength.

5. The device according to claim 4, wherein the third wavelength is located between the first wavelength and the second wavelength and/or in a resonant bandwidth of the first main resonance peak and/or in a resonant bandwidth of the second main resonance peak.

6. The device according to claim 4, wherein the device is structured to have at least one fourth resonance peak in polarization of the electromagnetic radiation parallel to the first direction of the antenna array, the at least one fourth peak being located in a fourth wavelength $\lambda_0$, located between the first wavelength and the second wavelength.

7. The device according to claim 2, wherein N=0.

8. The device according to claim 2, wherein the electrically conductive parts are identical to each other, the defined spatial period of the electrically conductive parts of the antenna array is less than the fourth wavelength $\lambda_0$.

9. The device according to claim 2, wherein on the at least one plasmonic resonator is a fifth functionalization layer for adsorbing and/or absorbing the specific molecules.

10. The device according to claim 2, wherein the third wavelength is greater than or equal to 2 μm and less than or equal to 20 μm.

11. The device according to claim 2, wherein the at least one second reflective layer is electrically conductive.

12. The device according to claim 2, further comprising a spectrometer for measuring a spectrum of the electromagnetic radiation emitted when the specific molecules are in contact with the at least one plasmonic resonator.

13. A biosensor comprising a device for detecting the presence of the specific molecules according to claim 2.

* * * * *